United States Patent
Kobayashi (10) Patent No.: US 6,744,709 B2
(45) Date of Patent: Jun. 1, 2004

(54) FOCUSING CONTROL APPARATUS, RECORDING MEDIUM, AND OPTICAL DISK PLAYBACK APPARATUS

(75) Inventor: Toshikazu Kobayashi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 501 days.

(21) Appl. No.: 09/798,799

(22) Filed: Mar. 2, 2001

(65) Prior Publication Data

US 2001/0024408 A1 Sep. 27, 2001

(30) Foreign Application Priority Data

Mar. 3, 2000 (JP) ........................................ 2000-059345
Feb. 28, 2001 (JP) ........................................ 2001-053801

(51) Int. Cl.$^7$ ............................................. G11B 7/095
(52) U.S. Cl. ................................. 369/44.25; 369/44.29; 369/53.28
(58) Field of Search ........................... 369/44.25, 44.27, 369/44.29, 53.28

(56) References Cited

U.S. PATENT DOCUMENTS 5,754,507 A * 5/1998 Nishikata ................. 369/44.29

FOREIGN PATENT DOCUMENTS

| JP | 11-039665 | 2/1999 |
|----|-----------|--------|
| JP | 11-191222 | 7/1999 |
| JP | 11-316954 | 11/1999 |
| JP | 2000-200431 | 7/2000 |

OTHER PUBLICATIONS

Electronic translation of detailed description of JP 11–316954.*

* cited by examiner

Primary Examiner—W. R. Young
(74) Attorney, Agent, or Firm—Katten Muchin Zavis Rosenman (57) ABSTRACT

In advance of the playback of an optical disk 11, the peaks of a focus error signal are detected, and the reference values of the focus error signal are set on the basis of the values of the peaks. In executing a layer jump, a kick signal for an object lens 13a is stopped from being outputted when the focus error signal exceeds the reference value of one polarity. A brake signal is outputted when the focus error signal exceeds the reference value in the opposite polarity. A time period for which the brake signal is outputted, is set on the basis of a time period for which the kick signal has been outputted. After the stop of the output of the brake signal, the peak of the focus error signal is waited for, whereupon a focusing servo 21 is turned ON.

4 Claims, 13 Drawing Sheets

FOCUSING CONTROL APPARATUS, RECORDING MEDIUM, AND OPTICAL DISK PLAYBACK APPARATUS

The application claims a priority based on Japanese Patent Application Nos. 2000-59345 and 2001-53801 filed on Mar. 3, 2000 and Feb. 28, 2001, respectively, the entire contents of which are incorporated herein by reference for all purposes.

BACKGROUND OF THE INVENTION

1. Field of the Invention

The present invention relates to a playback apparatus for a multilayer-recording optical disk. More particularly, it relates to layer jump control technology wherein an object lens is moved in its focusing direction in order to perform a focusing servo operation for any desired recording layer.

2. Description of the Prior Art

In recent years, an optical disk called "DVD" has come into practical use as a recording medium of large storage capacity. The DVD has at most two recording layers per side, and data can be recorded on both the sides thereof. The function of controlling the movement of an object lens in the focusing direction thereof ("layer jump function") is required of a playback apparatus for such a multilayer-recording optical disk in order that, when the playback of one recording layer (simply termed "layer" below) has been requested in a state where a focusing servo operation is proceeding for the other layer under playback, a focusing servo operation may be performed for the desired layer. A multilayer-recording optical disk playback apparatus in the prior art incarnates the above function by processing as stated below.

Figure 12:
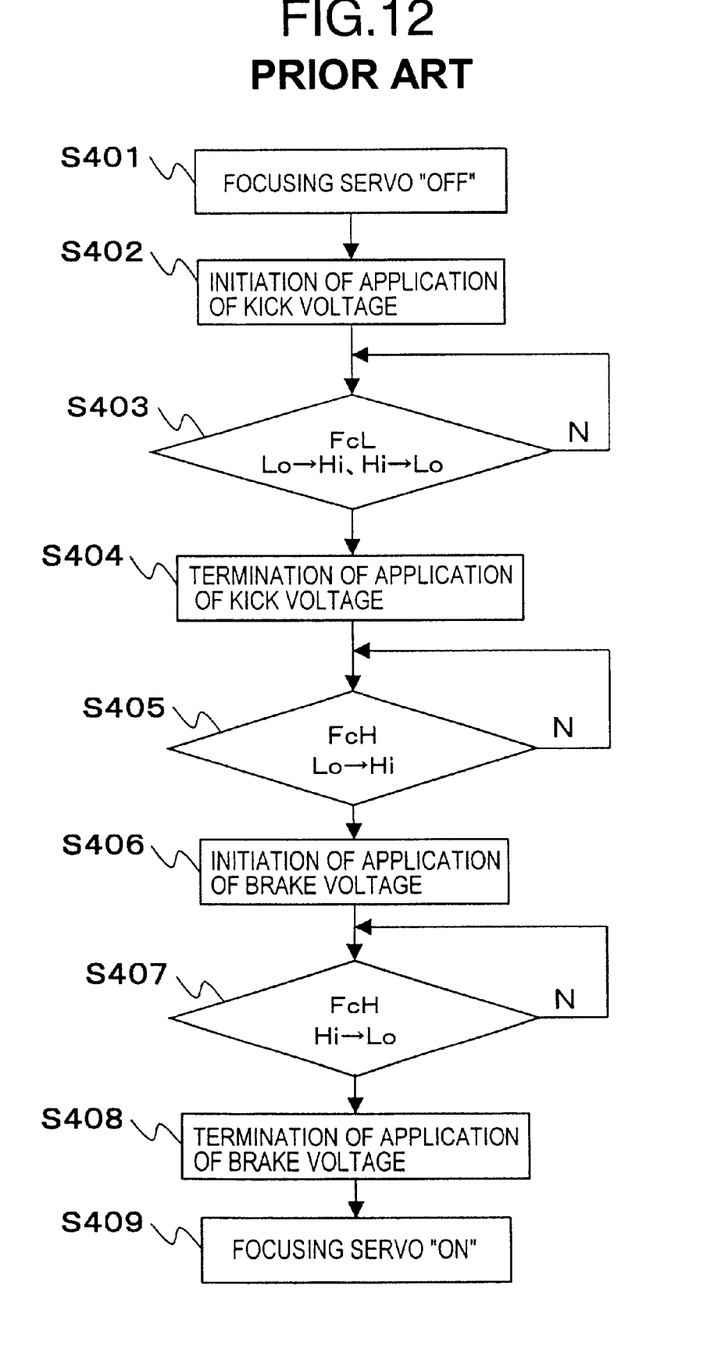
FIG. 12 is a flow chart of a layer jump process in a prior-art scheme.
Figure 13:
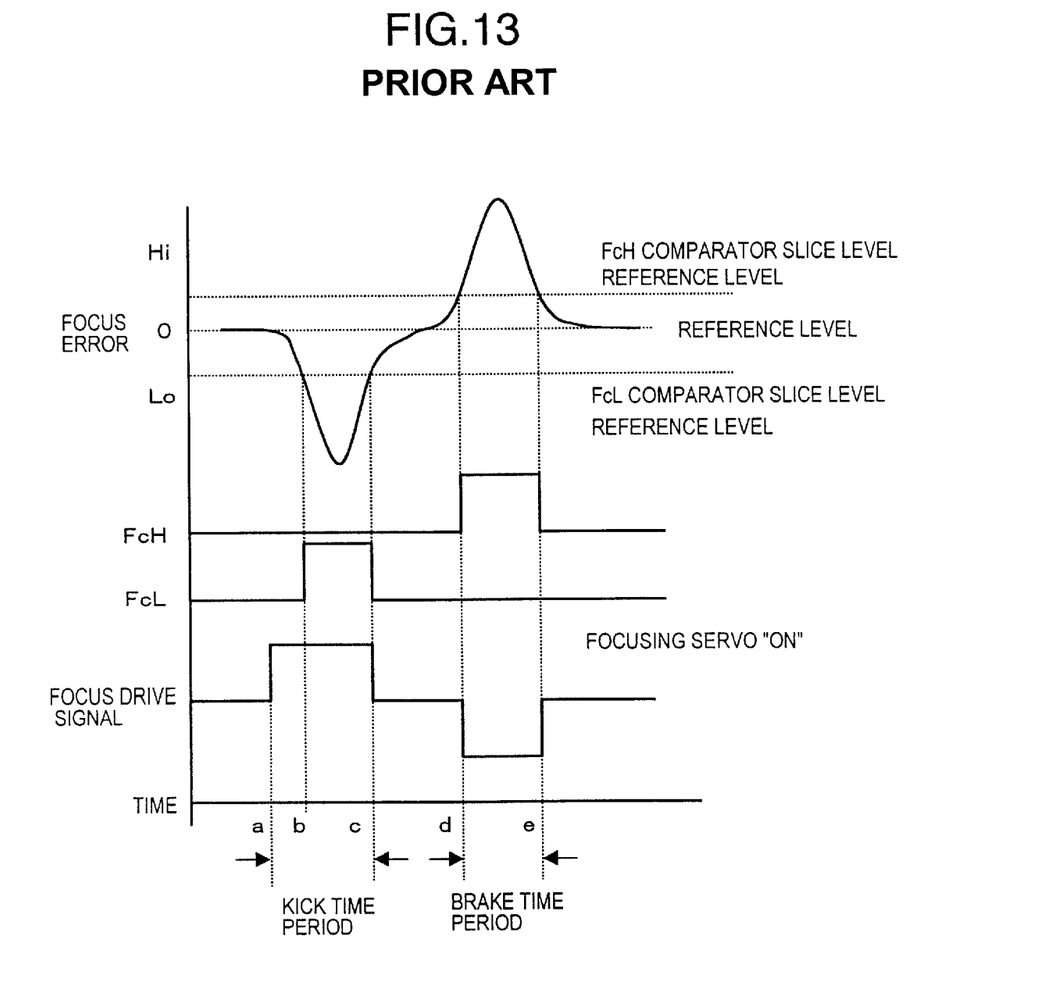
FIG. 13 is a timing chart showing the relationship among a focus error signal, control signals, etc. in the prior-art scheme.

FIG. 12 is a flow chart of a layer jump process in the case where, during the playback of the lower layer of an optical disk which includes the two recording layers of the lower layer (layer nearer to the object lens, and termed "layer 0") and an upper layer (termed "layer 1"), the playback of the upper layer has been requested. FIG. 13 is a timing chart showing the relationship among a focus error signal, control signals, etc. on this occasion. Referring to FIG. 13, FcH and FcL comparator slice levels are reference voltages with which the focus error signal is compared and whose values are set at the shipment of the playback apparatus beforehand. The FcH signal assumes a Hi (high) output during a time period for which the voltage of the focus error signal exceeds the FcH comparator slice level (the voltage goes Hi), whereas it assumes a Lo (low) output during any other time period. On the other hand, the FcL signal assumes the Hi output during a time period for which the voltage of the focus error signal exceeds the FcL comparator slice level (the voltage goes Lo), whereas it assumes the Lo output during any other time period.

A coil portion is disposed around an object lens which condenses a laser beam on the recording layer of the optical disk, and they are supported by a spring so as to be ascendible and descendible. When a kick voltage is applied to the coil, a force is exerted in the direction of bringing the object lens near to the optical disk. In contrast, when a brake voltage is applied, a force is exerted in the direction of bringing the object lens away from the optical disk.

When the playback of the layer 1 is requested during the playback of the layer 0, that is, in a state where a focusing servo operation is proceeding for the layer 0, the playback apparatus turns OFF a focusing servo (S401), whereupon it applies the kick voltage in the direction in which the object lens ascends (that is, in which the object lens comes near to the optical disk) (S402, time a in FIG. 13). Thereafter, it monitors a course from the rise of the pulse FcL (time b in FIG. 13) till the fall thereof (time c in FIG. 13) (S403). Upon detecting the fall of the pulse FcL, it terminates the application of the kick voltage (S404). Thereafter, it begins to monitor the rise of the pulse FcH (time d in FIG. 13) (S405). Upon detecting the rise of the pulse FcH (time d in FIG. 13), it applies the brake voltage in the direction in which the object lens descends (S406). Thereafter, it begins to monitor the fall of the pulse FcH (S407). Upon detecting the fall of the pulse FcH (time e in FIG. 13), it stops the application of the brake voltage (S408). Subsequently, it turns ON the focusing servo (S409), thereby to start the playback of the layer 1. Incidentally, control processing in a tracking direction is omitted here.

SUMMARY OF THE INVENTION

In the process explained above, the FcH and FcL comparator slice levels have the preset constant values. Therefore, the layer jump function cannot cope with discrepancy in the error levels of individual optical disks or playback apparatuses, or changes in the characteristics of the playback apparatus attributed to ambient conditions such as temperature. Moreover, since the comparator slice levels need to be confined within the peak levels of the focus error signal reliably in any playback state, they cannot be set at very large values. Therefore, in case of the occurrence of a focus error phenomenon called "stray light" wherein a small peak different from the essential peaks of the focus error signal appears in the vicinity of the reference level thereof, the layer jump might end in failure due to the misrecognition of a peak point, depending upon the values of the comparator slice levels.

An object of the invention is to provide a layer jump technique of high stability which can cope with discrepancy in the error levels of individual optical disks or playback apparatuses, and changes in the characteristics of the playback apparatus attributed to ambient conditions such as temperature.

In order to accomplish the above object, a focusing control device according to the invention is characterized by comprising an object lens which condenses a light beam on an optical disk constructed of a plurality of signal recording layers; focusing drive means for moving said object lens in a direction orthogonal to the recording layers of the optical disk; photodetection means for detecting light reflected from said optical disk; focus error signal generation means for generating a focus error signal which corresponds to defocusing of said object lens relative to any of said recording layers of said optical disk, on the basis of a detection signal of said photodetection means; peak detection means for detecting peaks of the focus error signal; reference value calculation means for calculating reference values of said focus error signal in accordance with detection signals of said peak detection means; comparison signal generation means for comparing said focus error signal with its reference values, and generating comparison signals based on results of the comparisons; and control means for accepting a request for moving a focusing position of said object lens, and generating and outputting signals which control said focusing drive means, on the basis of the detection signals of said peak detection means and the comparison signals.

PREFERRED EMBODIMENTS OF THE INVENTION

Figure 1:
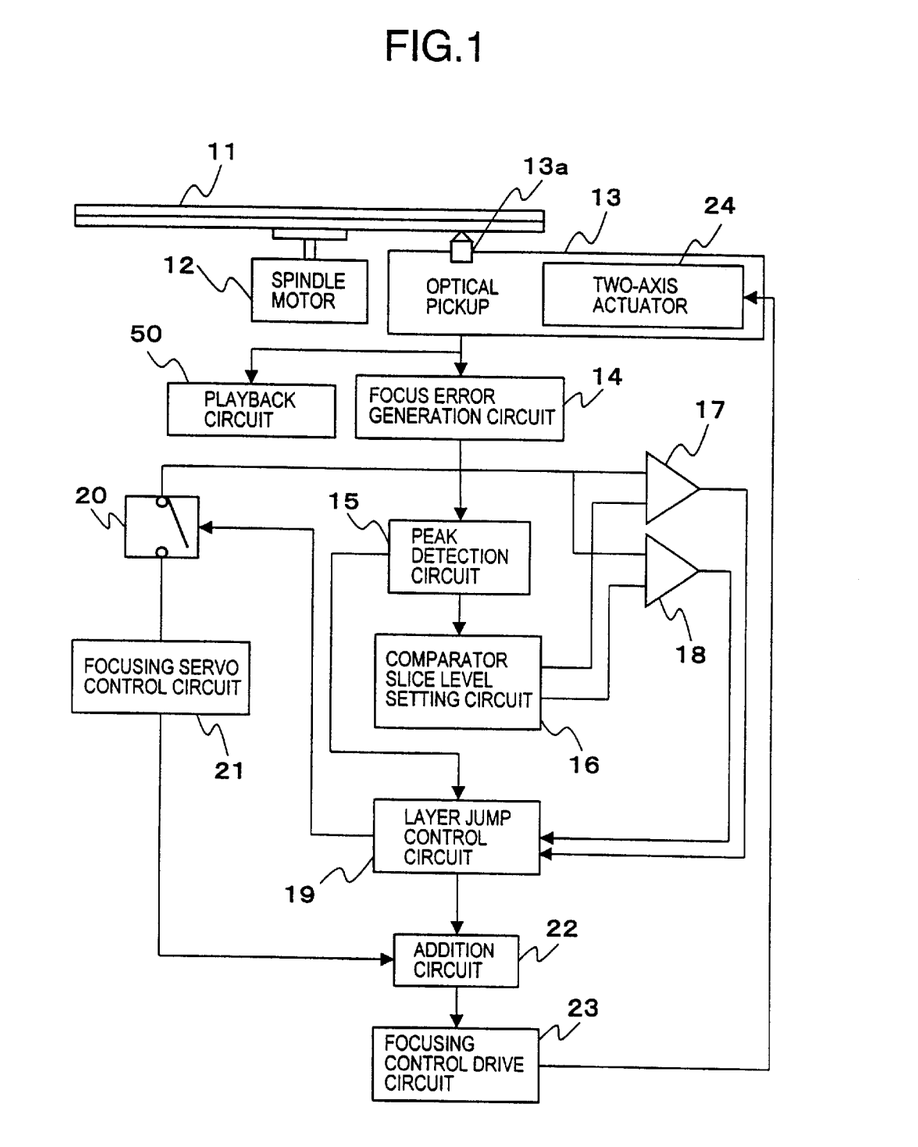
FIG. 1 is a block diagram showing the focusing control mechanism of a multilayer-recording optical disk playback system.

An aspect of performance of the invention will be described with reference to the drawings. FIG. 1 is a block diagram showing the focusing control mechanism of a multilayer-recording optical disk playback system.

With the multilayer-recording optical disk playback system, an optical disk 11 having a multilayer-recording structure, for example, DVD is driven to rotate at a predetermined speed by a spindle motor 12. A laser beam is projected from an optical pickup 13, and is condensed on the recording layer of the optical disk 11 by an object lens 13a. Light reflected from the recording layer is read by the optical pickup 13. Part of the read optical signal is converted into an electric signal, which is inputted to a focus error generation circuit 14. The focus error generation circuit 14 generates a focus error signal from the converted electric signal. Here, the focus error signal can be generated, for example, in such a way that quadrantal photodetection elements are disposed in the light receiving portion of the optical pickup 13, and that the difference among the outputs of the upper, lower, right and left photodetection elements is amplified in accordance with an astigmatism method.

Besides, the signal read by the optical pickup 13 is converted into an electric signal (RF signal), which is inputted to a playback circuit 50. The playback circuit 50 plays back audio data, video data, etc. on the basis of a digital signal recorded on the recording layer of the optical disk 11.

The focus error signal generated by the focus error generation circuit 14 is inputted to a peak detection circuit 15, an FcH comparator 17, an FcL comparator 18 and a switch 20.

The FcH comparator 17 outputs an FcH signal in a case where the focus error signal has exceeded an FcH comparator slice level. The FcL comparator 18 outputs an FcL signal in a case where the focus error signal has exceeded an FcL comparator slice level. The FcH and FcL comparator slice levels are reference voltages which are set by a comparator slice level setting circuit 16 in advance of the playback of the disk 11, and a setting method therefor will be explained later. The FcH signal and FcL signal respectively outputted by the comparators 17 and 18 are both inputted to a layer jump control circuit 19.

During a peak level detection process which precedes the optical disk playback, the peak detection circuit 15 detects the peak point of the focus error signal and measures the peak voltage thereof, which is outputted to the comparator slice level setting circuit 16. During the optical disk playback, the circuit 15 detects the peak point of the focus error signal and outputs a detection signal to the layer jump control circuit 19.

The comparator slice level setting circuit 16 sets the comparator slice levels every optical disk playback operation. The comparator slice levels are set as the two levels on Hi (high) and Lo (low) sides in accordance with the peak voltage of the focus error signal in the peak level detection process, and they are respectively compared with the focus error signal in the comparators 17 and 18 during the optical disk playback.

The layer jump control circuit 19 performs the control of a layer jump process in the case where, in a state in which a focusing servo operation is proceeding for a certain recording layer, the playback of another recording layer has been requested during the playback of the optical disk 11. More specifically, when the playback of the other recording layer has been requested, the layer jump control circuit 19 actuates the switch 20 to turn OFF a focusing servo. Thereafter, the circuit 19 outputs a signal for driving the object lens 13a, to an addition circuit 22 while monitoring the signals of the comparators 17, 18 and the signal of the peak detection circuit 15. When the layer jump process has been completed in due course, the circuit 19 actuates the switch 20 to turn ON the focusing servo. Besides, the circuit 19 has the function of measuring a time period for which the signal is outputted, and the function of controlling the time period for which the signal is outputted.

A focusing servo control circuit 21 is constituted by a bias adjustment circuit, a gain adjustment circuit, a phase compensation circuit, an amplification circuit, etc., and it executes a focusing servo process in which a control signal to be applied to a focusing drive coil is generated so that the inputted focus error signal may assume its reference level. That is, the focusing servo control circuit 21 executes a process in which the focused position of the laser beam is kept following up a signal recording surface against the so-called "surface oscillations" etc. of the optical disk 11 during the rotation thereof. The ON/OFF of the input of the focus error signal to the focusing servo control circuit 21 is controlled by turning ON/OFF the switch 20.

The addition circuit 22 adds up the object lens 13a driving signals delivered from the focusing servo control circuit 21 and the layer jump control circuit 19, and outputs the resulting signal to a focusing control drive circuit 23.

The focusing control drive circuit 23 generates a voltage for driving the object lens 13a as corresponds to the inputted control signal, and feeds the voltage to a two-axis actuator 24.

By the way, the above processes of the individual circuits may well be incarnated by software.

The two-axis actuator 24 drives the object lens 13a of the optical pickup 13 to move in two directions; the focusing direction of the object lens 13a and the radial direction of the optical disk 11.

Figure 2:
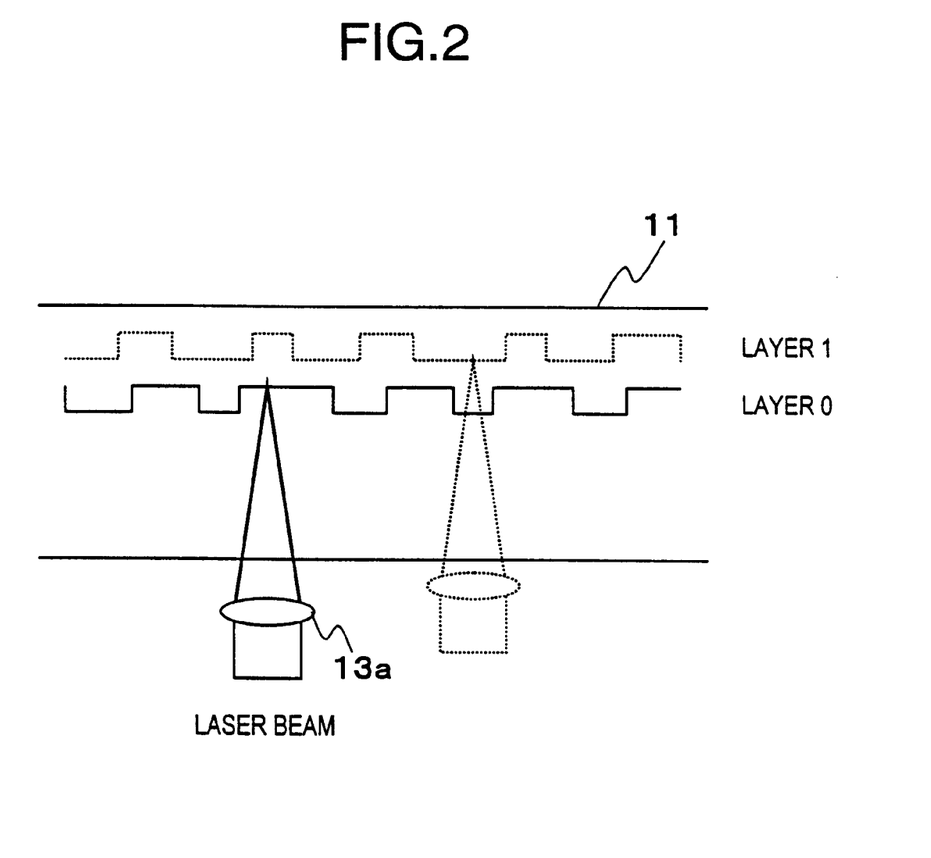
FIG. 2 is a sectional view for explaining the structure of a multilayer-recording optical disk.

In this embodiment, the multilayer-recording optical disk 11 is constructed as a two-layer structure which has two recording layers as shown in FIG. 2. Herein, the layer near to the object lens 13a in the playback mode shall be called the "layer 0", and the layer remote therefrom the "layer 1". In the figure, the recording layer indicated by a solid line is the layer 0, while the recording layer indicated by a broken line is the layer 1. The outside dimensions of the multilayer-recording optical disk 11 are, for example, a diameter of 120 mm and a thickness of 1.2 mm which are equal to those of a CD-ROM. The DVD, however, has a structure in which two disks each being 0.6 mm thick are stuck together. Each side of the DVD has at most two recording layers, and data can be recorded on both the sides thereof. The storage capacities of the DVD are 4.7 Gbytes in case of recording on one layer of one side, 8.5 Gbytes in case of recording on the two layers of one side, 9.4 Gbytes in case of recording on one layer of each of both the sides, and 17 Gbytes in case of recording on the two layers of each of both the sides. The track pitch of the DVD is 0.74 μm, and the wavelength of a data reading laser employed for the playback system is 650 nm. Incidentally, it is a matter of course that the layer jump control according to the invention is applicable, not only to the optical disk of the two-layer structure, but also to an optical disk having a layer structure of at least three layers.

Figure 3:
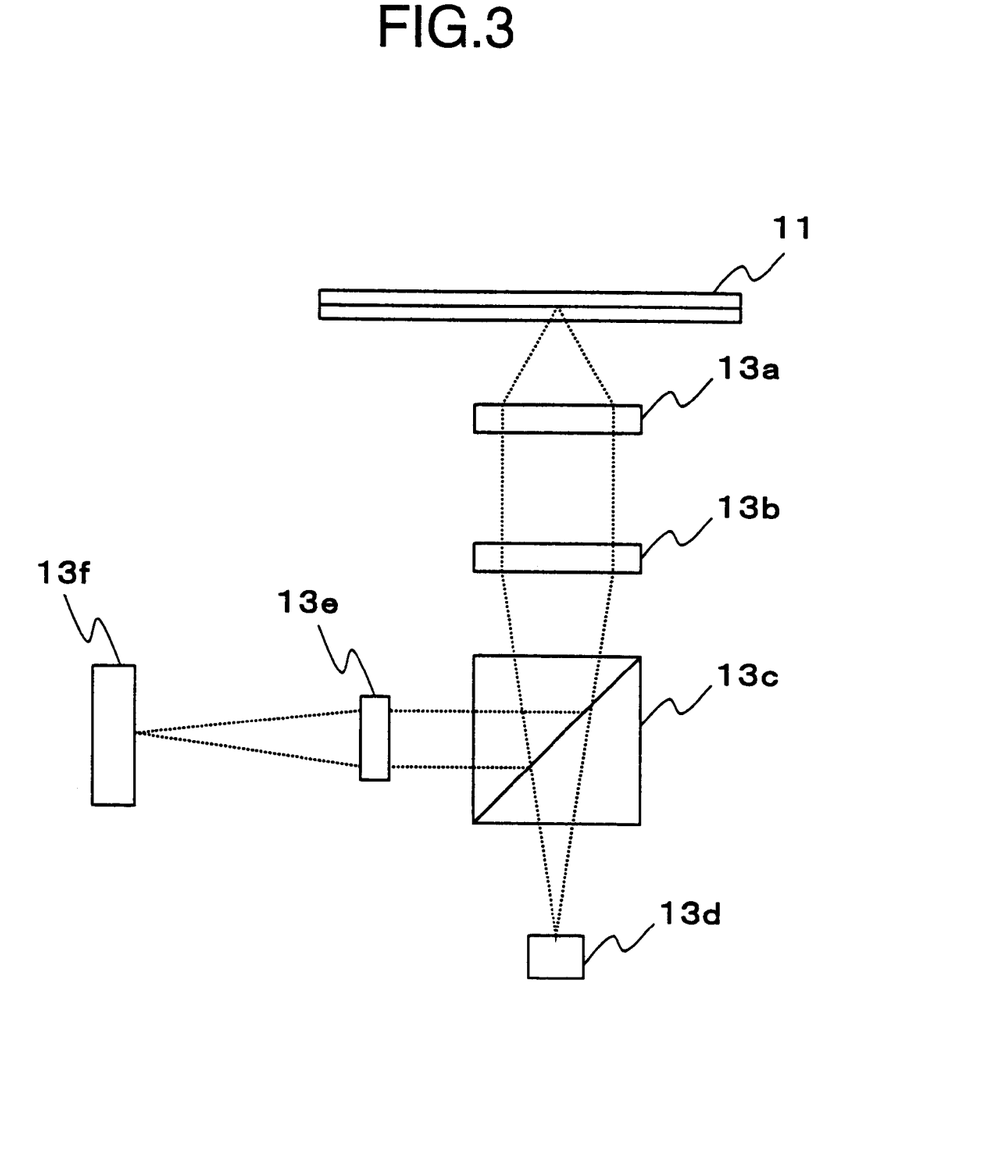
FIG. 3 is a diagram for explaining an example of the structure of an optical pickup.

Data are read from the optical disk 11 by the optical pickup 13. As shown in FIG. 3 by way of example, the optical pickup 13 is constituted by the object lens 13a, a collimating lens 13b, a polarizing prism 13c, a semiconductor laser oscillator 13d, a cylindrical lens 13e and a photo-detection element 13f. A laser beam emitted from the semiconductor laser oscillator 13d propagates rectilinearly through the polarizing prism 13c, and passes through the collimating lens 13b. Thereafter, the collimated laser beam is condensed on any recording layer of the optical disk 11 by the object lens 13a. Light reflected from the optical disk 11 retrogrades through the object lens 13a, and passes through the collimating lens 13b. Thereafter, the collimated light beam is orthogonally bent by the polarizing prism 13c, and the bent light beam falls on the photodetection element 13f through the cylindrical lens 13e.

Figure 4:
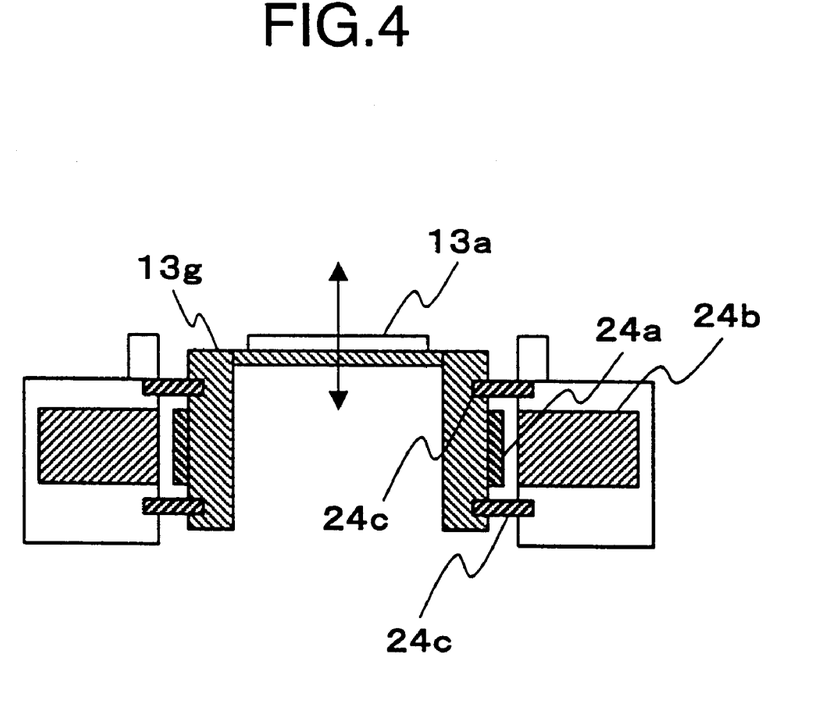
FIG. 4 is a sectional view for explaining the drive mechanism of a two-axis actuator in a focusing direction.

FIG. 4 is a sectional view showing a mechanism in which the object lens 13a is driven in its focusing direction by the two-axis actuator 24. The object lens 13a is supported by object lens supporting springs 24c through an object lens fixture 13g so as to be vertically and horizontally movable. A focusing coil 24a is disposed around the object lens 13a, and a magnet 24b is further disposed outside the focusing coil 24a. When the focusing coil 24a is fed with a control signal, the object lens 13a is given a driving force in its focusing direction as indicated by a double-headed arrow.

Figure 5:
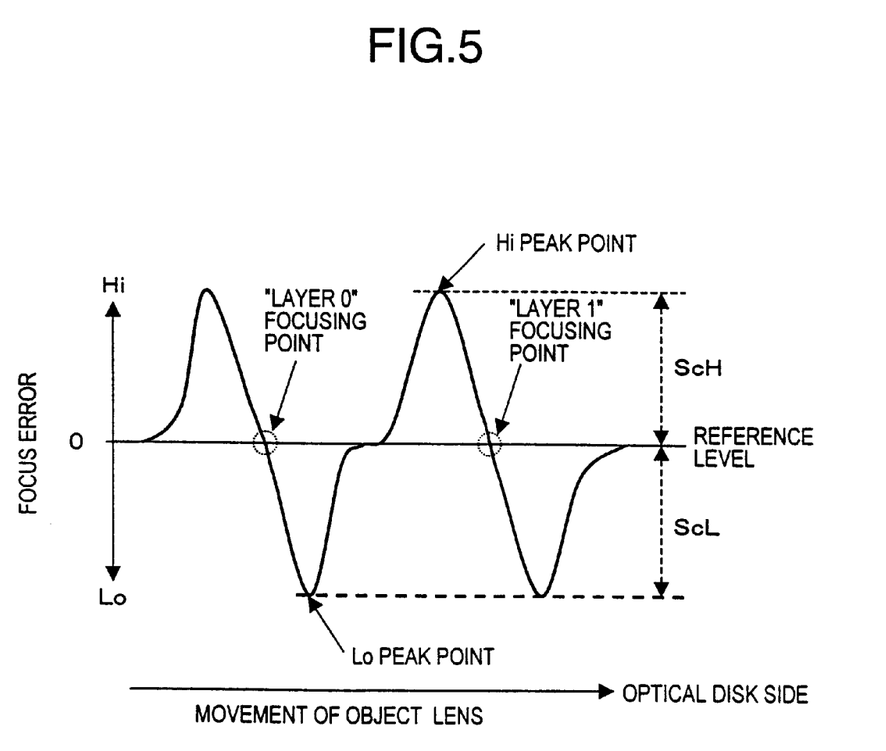
FIG. 5 is a waveform diagram of a focus error signal measured in a case where an object lens has moved from a position remote from a two-layer-recording optical disk to a position near to this optical disk.

FIG. 5 is a waveform diagram of the focus error signal in the case where the object lens 13a has moved from a position remote from the two-layer-recording optical disk 11, to a position near this optical disk 11. Referring to the figure, a "layer 0" focusing point indicated by an arrow is the focusing position of the lower layer (layer 0), and a "layer 1" focusing point is the focusing position of the upper layer (layer 1). Here, the focus error levels of the "layer 0" focusing point and "layer 1" focusing point change depending upon optical characteristics, and they do not always agree. An upward direction and a downward direction shall be set as a Hi (high) direction and a Lo (low) direction with respect to the voltage 0 (zero) of the focus error signal.

When the object lens 13a begins to move from the position remote from the optical disk 11, the focus error signal forms a peak in the Hi direction once, and it comes to the focusing point of the layer 0 in the vicinity of the reference level reached. Thereafter, the focus error signal forms a peak in the Lo direction, and it passes through the reference level again and forms a peak in the Hi direction. Further, the focus error signal comes to the focusing point of the layer 1 in the vicinity of the reference level subsequently reached. When the object lens 13a moves to a position nearer to the optical disk 11 yet, the focus error signal forms a peak in the Lo direction again.

Figure 6:
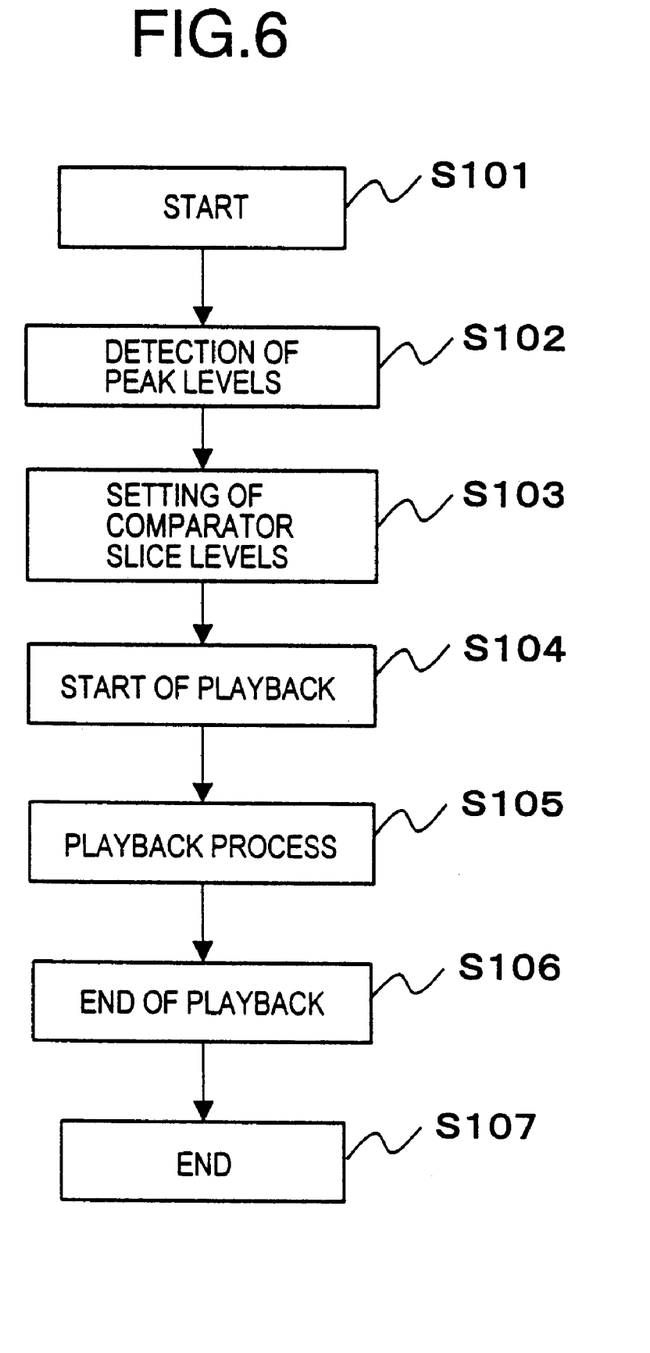
FIG. 6 is a flow chart for explaining the processing of the focusing control mechanism.

The processing operation of the focusing control mechanism constructed as explained above will be described with reference to a flow chart shown in FIG. 6.

First, the processing is started (S101) in such a case where the optical disk 11 has been loaded, or where a power source has been turned ON in a loaded state. Then, the peak detection circuit 15 detects peak levels (S102). In this manner, the processing is executed every optical disk, whereby the layer jump process is permitted to cope with discrepancy in the characteristics of the optical disks, changes in the ambient conditions of the playback system, etc.

Figure 7:
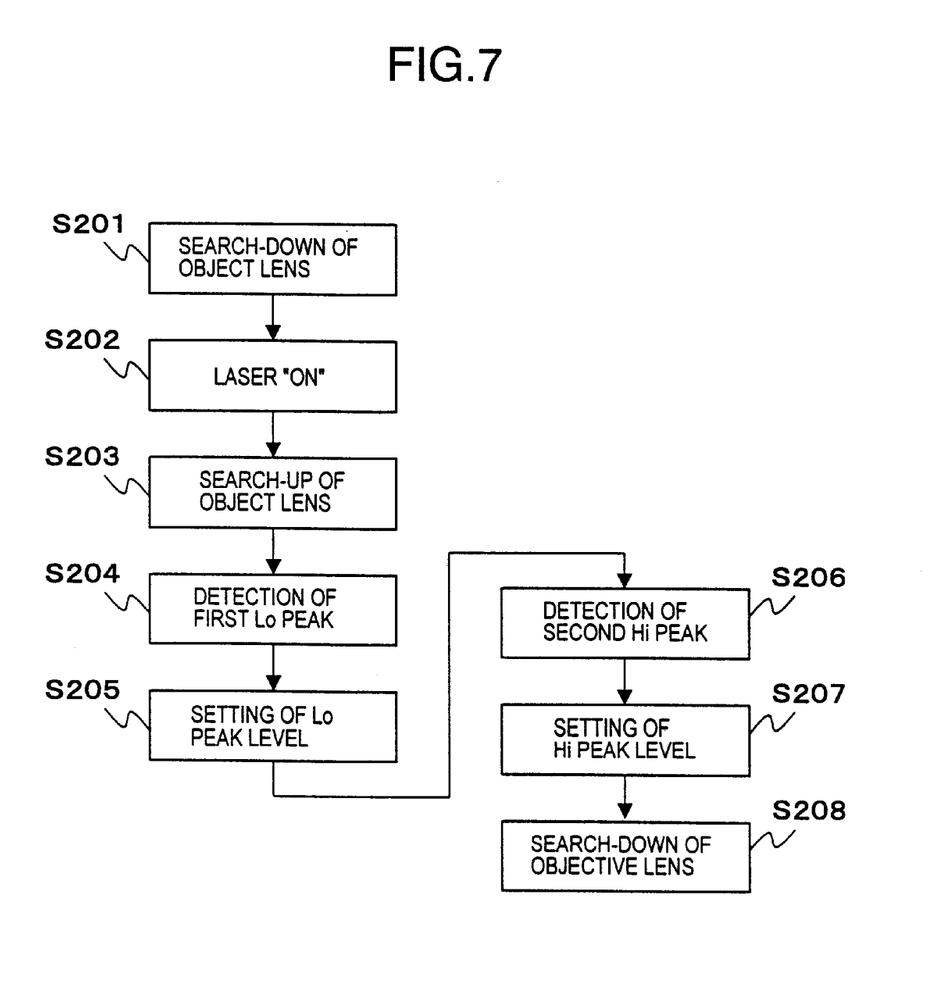
FIG. 7 is a flow chart showing a peak level detection process.

Here, the peak level detection process (S102) will be described by referring to the waveform diagram of FIG. 5 again and to a flow chart shown in FIG. 7. First, the object lens 13a is set at a position remote from the optical disk 11 (search-down, S201). Subsequently, the laser emission is turned ON (S202). Further, the object lens 13a is gradually moved to a position near to the optical disk 11 (search-up, S203), and the change of the focus error signal is monitored. On this occasion, the focus error signal depicts a waveform shown in FIG. 5 as explained before. Peak points to be detected are the two points of the Lo peak point and Hi peak point indicated by arrows. The reason therefor is that, in a case where a focusing servo operation is proceeding for either of the layer 0 and the layer 1 and where focusing is to be shifted to the other layer in this state, a range in which the object lens 13a moves is limited between the "layer 0" focusing point and the "layer 1" focusing point indicated in FIG. 5.

Accordingly, the peak of the Hi side first detected is neglected in the peak level detection, and the voltage of the focus error signal relative to the reference level thereof at the Lo peak point first detected as the peak of the Lo side (S204) is set as a Lo peak level ScL (S205). Besides, the voltage of the focus error signal relative to the reference level thereof at the Hi peak point secondly detected as the peak of the Hi side (S206) is set as a Hi peak level ScH (S207). Thereafter, the object lens 13a is restored to its original position (S208), thereby to end the peak level detection process (S102).

When the peak levels ScH and ScL have been acquired by the peak level detection (S102), the comparator slice level setting circuit 16 sets the FcH comparator slice level and FcL comparator slice level being the reference voltages of the focus error level, on the basis of the values of the peak levels ScH and ScL by a method explained below (S103). More specifically, the FcH comparator slice level is set at a value which is obtained by multiplying the peak level ScH by a predetermined coefficient a, and the FcL comparator slice level at a value which is obtained by multiplying the peak level ScL by a predetermined coefficient β. Here, the values of the coefficients α, β are positive values less than 1, for example, 0.2 or 0.5, and specified values are set as concrete numerical values in accordance with the characteristics of the optical disk playback apparatus beforehand. Incidentally, each of the coefficients α, β can also be set at values which differ between in case of shifting the layer 0 to the layer 1 and in case of shifting the layer 1 to the layer 0.

Since, in this manner, the comparator slice levels are set every operation of inserting the disk, every operation of turning ON the power source and every operation of starting playback in a stopped state, the values thereof can cope with discrepancy in the error levels of the individual disks and changes in the ambient conditions. Especially, even when a small peak offset has appeared in the vicinity of the reference level on account of the stray light component of an optical system, no influence is exerted by presetting the values of the coefficients $\alpha$, $\beta$ so as to confine the peak offset within the comparator slice levels. Accordingly, the stability of the layer jump becomes very good.

When the comparator slice levels have been set, a playback instruction given by the operator of the playback system is accepted (S104), and a playback process is started (S105).

Next, the layer jump process according to the invention will be described with reference to the drawings by taking a case where the playback of the layer 1 has been requested while a focusing servo operation is proceeding for the layer 0, as an example of an operation in the playback process (S105).

Figure 8:
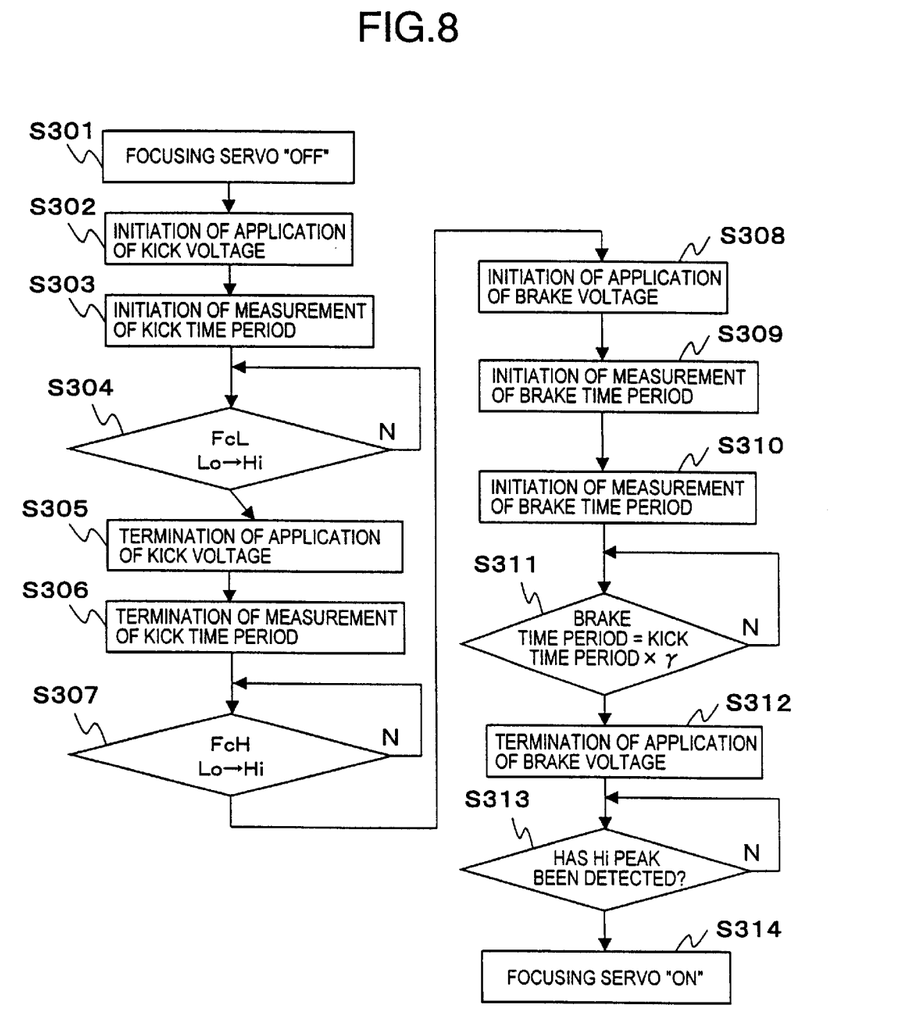
FIG. 8 is a flow chart for explaining a layer jump process.
Figure 9:
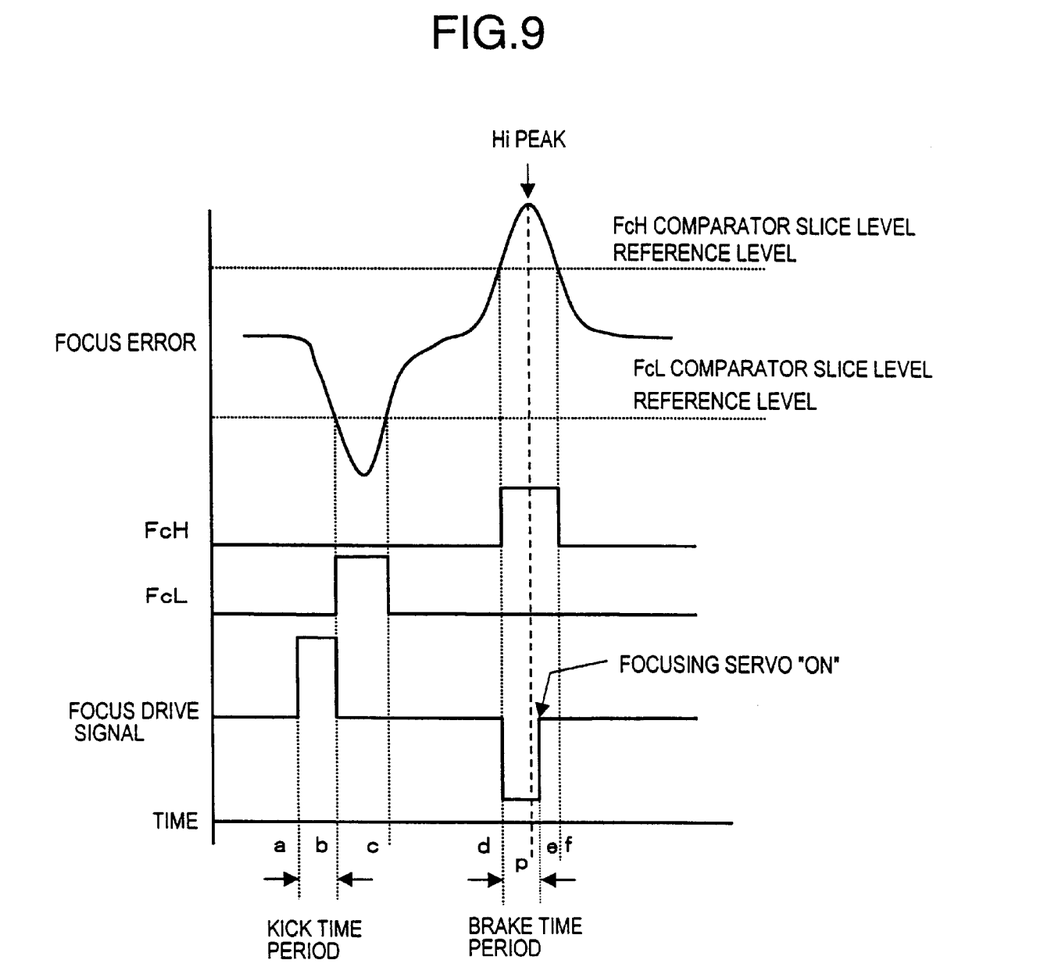
FIG. 9 is a timing chart showing the relationship among a focus error signal, control signals, etc.
Figure 10:
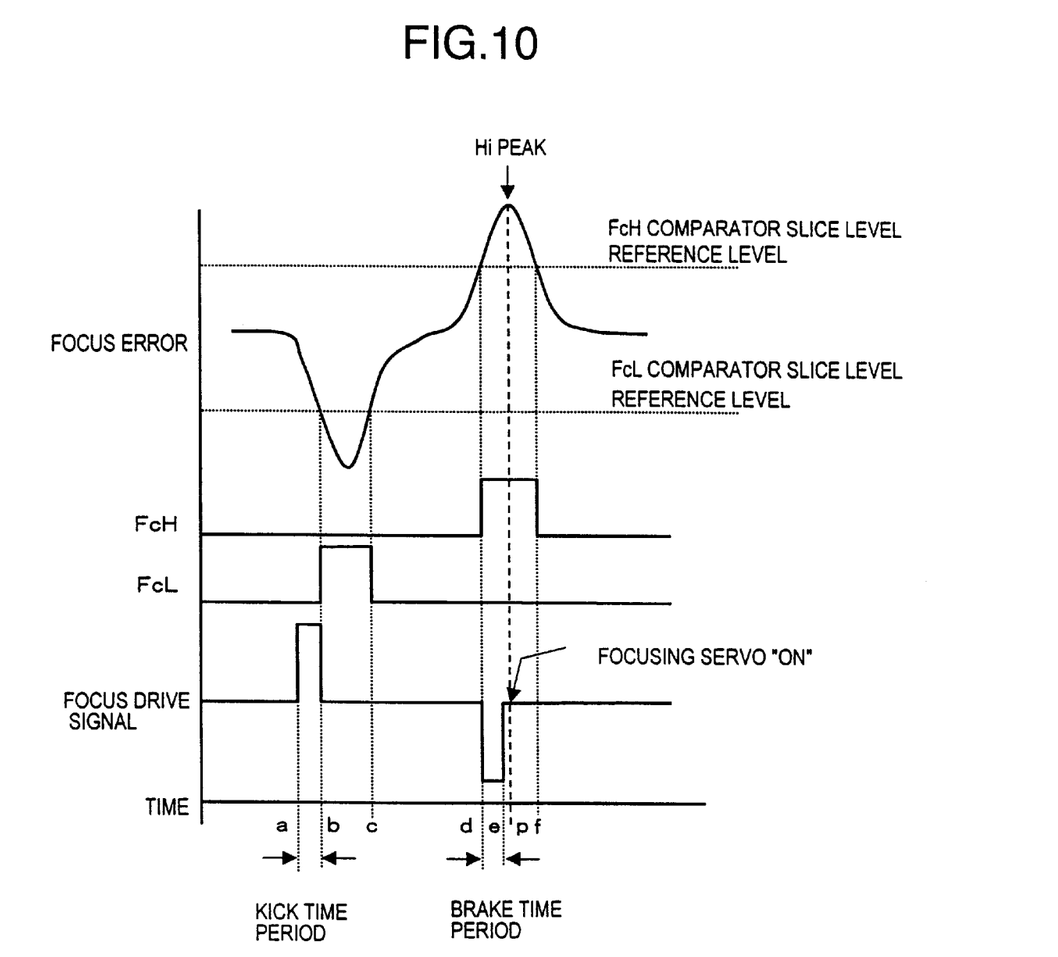
FIG. 10 is a timing chart showing the relationship among the focus error signal, the control signals, etc.

FIG. 8 is a flow chart for explaining the process on this occasion. Besides, FIGS. 9 and 10 are timing charts in the case of the layer jump from the layer 0 to the layer 1. In each of FIGS. 9 and 10, the lowermost stage represents the time. A time a corresponds to the initiation of the application of a kick voltage, a time b the termination of the application of the kick voltage, a time d the initiation of the application of a brake voltage, a time e the termination of the application of the brake voltage, and a time p the detection of a Hi peak. FIG. 9 illustrates a case where the time e of the brake voltage application termination is later than the time p of the Hi peak detection, whereas FIG. 10 illustrates a case where the time e of the brake voltage application termination is earlier than the time p of the Hi peak detection.

When the playback of the layer 1 is requested during the playback of the layer 0, that is, in a state where a focusing servo operation is proceeding for the layer 0, the layer jump control circuit 19 changes-over the switch 20 to turn OFF a focusing servo (S301). Subsequently, the layer jump control circuit 19 sends a signal for generating the kick voltage in the direction in which the object lens 13a ascends (that is, in which the object lens 13a comes near to the optical disk 11), to the focusing drive circuit 23 through the addition circuit 22 (S302, time a in FIG. 9, time a in FIG. 10), and it initiates the measurement of a kick time period (S303). Thereafter, it begins to monitor the rise of the signal FcL (S304) through the peak detection circuit 15. Upon detecting the rise of the pulse FcL (time b in FIG. 9, time b in FIG. 10), the layer jump control circuit 19 terminates the application of the kick voltage (S305), and it terminates the measurement of the kick time period (S306). Since the measured kick time period serves as the reference of a brake time period, it is held by the layer jump control circuit 19.

In this manner, according to the invention, the application of the kick voltage is terminated in accordance with the rise of the pulse FcL, so that the application time period of the kick voltage can be shortened. This signifies that a time period since the time of the kick voltage application termination till the time of the brake voltage application initiation can be set long. Therefore, the two-axis actuator 24 is permitted to initiate braking when it has become stable, and the converging capability of the two-axis actuator 24 is enhanced.

By the way, the kick voltage should desirably be higher. The reason therefor is that, when the kick voltage is higher, the application time period shortens still further, so the converging capability is enhanced more. When the converging capability is higher, the layer jump can be quickened more, and playback which is a larger number of times faster can be realized.

Figure 11A:
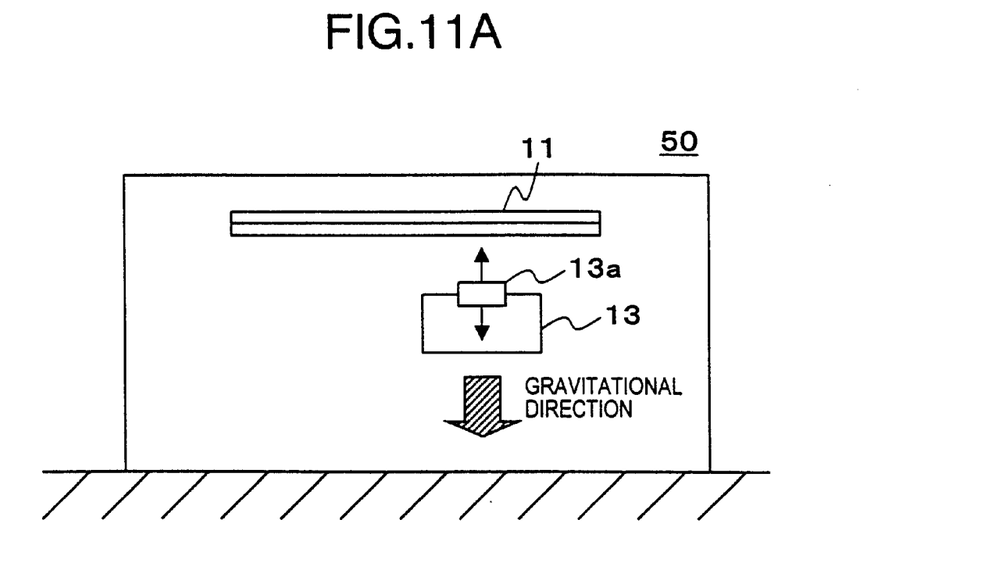
FIGS. 11A and 11B are schematic views for explaining the influence of gravitation as depends upon whether a playback apparatus is of horizontal type or of vertical type.
Figure 11B:
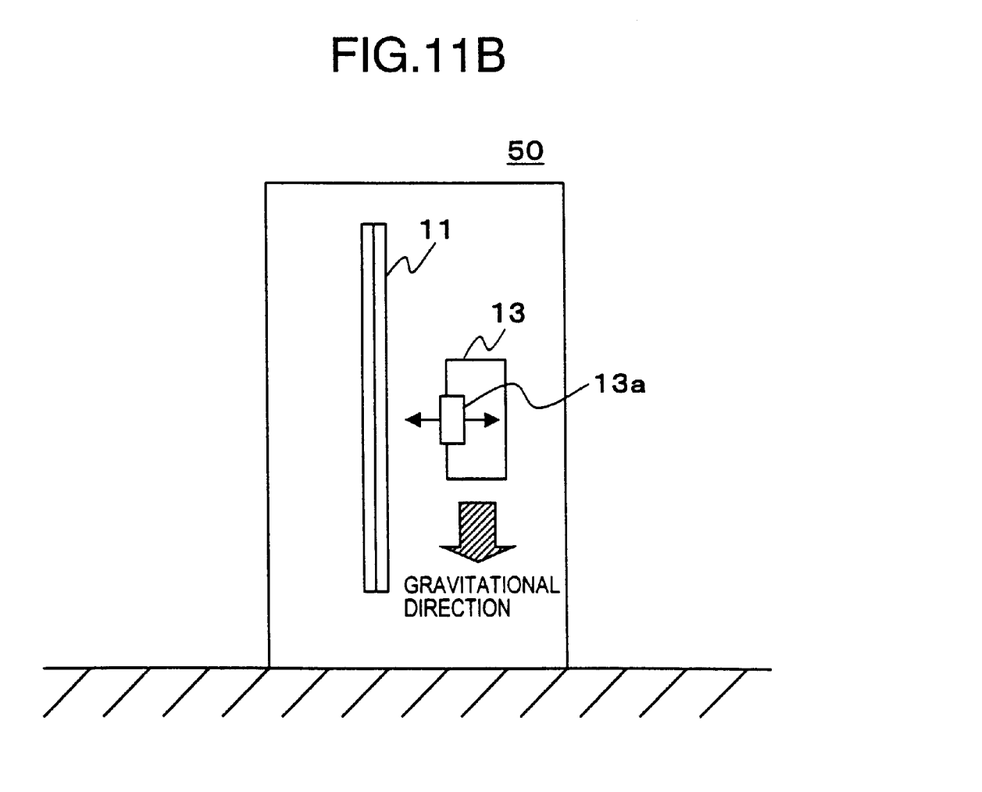

Moreover, owing to the higher converging capability, it is permitted to relieve the differences of characteristics attributed to a different effective gravitational direction involved between the horizontal type of the playback apparatus (in which the rotating surface of the disk is located horizontal) and the vertical type thereof (in which the rotating surface of the disk is located vertical). FIGS. 11A and 11B are schematic views for explaining the presence or absence of the influence of gravitation in the case where the playback apparatus 50 is of the horizontal type or vertical type. In the case where the playback apparatus 50 is horizontally installed as shown in FIG. 11A, the gravitation acts on the object lens 13a in parallel with the focusing direction of this object lens, and hence, the apparatus 50 is influenced by the gravitation. In contrast, in the case where the playback apparatus 50 is vertically installed as shown in FIG. 11B, the gravitation acts on the object lens 13a perpendicularly to the focusing direction of this object lens, and hence, the apparatus 50 is not influenced by the gravitation. When the converging capability of the two-axis actuator 24 is heightened, a time period for which the horizontal type is influenced by the gravitation can be shortened. It is therefore possible to relieve the differences of the characteristics between the vertical type and the horizontal type attributed to the influence of the gravitation.

Subsequently, the layer jump control circuit 19 begins to monitor the rise of the signal FcH (S307) through the peak detection circuit 15. Upon detecting the rise of the pulse FcH (time d in FIG. 9, time d in FIG. 10), the layer jump control circuit 19 sends a signal for generating the brake voltage in the direction in which the object lens 13a descends (that is, in which the object lens 13a comes away from the optical disk 11), to the focusing drive circuit 23 through the addition circuit 22 (S308), and it initiates the measurement of a brake time period (S309).

The brake signal is kept sent until the brake time period equalizes to a value obtained in such a way that the kick time period measured before is multiplied by a coefficient $\gamma$ (S311). Here, the coefficient $\gamma$ is one for adjusting the time lag of the control circuit 19 as to the setting of the brake time period relative to the kick time period, and it is set at the numerical value of, for example, 0.8 or 0.9. Incidentally, the coefficient $\gamma$ can also be set at values which are different between in the case of the jump from the layer 0 to the layer 1 and in the case of the jump from the layer 1 to the layer 0.

When the brake time period has equalized to the value obtained by multiplying the kick time period by the coefficient $\gamma$ (time e in FIG. 9, time e in FIG. 10), the layer jump control circuit 19 terminates the application of the brake voltage (S312).

By the way, the brake time period may well be set at a value obtained by subtracting the time lag of the control circuit 19 from the measured kick time period, instead of the value obtained by multiplying the kick time period by the coefficient $\gamma$.

Since the brake time period corresponding to the kick time period is set in this manner, the converging capability of the two-axis actuator 24 can be heightened.

In the meantime, the peak detection circuit 15 is monitoring the Hi peak of the focus error signal (S310). The layer jump control circuit 19 judges whether or not the Hi peak point (time p in FIG. 9, time p in FIG. 10) has already been detected at the time of the brake voltage application termination (time e in FIG. 9, time e in FIG. 10). Here, in a case where the Hi peak point has been detected, the focusing servo is turned ON (S314), and the playback of the layer 1 is started. On the other hand, in a case where the Hi peak point has not been detected yet at the time of the brake voltage application termination, the detection of the Hi peak point is waited for (S313), and the focusing servo is turned ON (S314) so as to start the playback of the layer 1 after the Hi peak point (time p in FIG. 9, time p in FIG. 10) has been detected. Such processing is based on the fact that a stable focusing servo operation is performed by turning ON the focusing servo after the Hi peak point has been passed. More specifically, when the focusing servo is turned ON immediately after the brake voltage application termination, an interval before the Hi peak point lies outside a focusing pull-in range, and hence, focusing might not be pulled in. In contrast, according to the processing, the focusing servo is turned ON after the Hi peak point without fail, so that the focusing can be reliably pulled in.

In a case where the playback of the layer 0 has been requested during a focusing servo operation for the layer 1, merely the directions of applying the kick voltage and the brake voltage and the upward and downward directions of the focus error signal are inverted, and the basic processing contents can be executed by substantially the same algorithm as in the case where the playback of the layer 1 has been requested during the focusing servo operation for the layer 0.

After the layer jump processes as explained above have been repeated, the playback of the optical disk 11 is ended (S106).

As thus far described, according to the invention, it is possible to realize a layer jump of high stability which copes with discrepancy in the error levels of individual disks or playback apparatuses, and changes in the characteristics of the playback apparatus attributed to ambient conditions such as temperature.

What is claimed is:

1. A focus control apparatus for use in an optical disk playback apparatus, comprising:
    an object lens which condenses a light beam on an optical disk having a plurality of signal recording layers;
    focusing drive means for moving said object lens in a direction orthogonal to the recording layers of the optical disk;
    photodetection means for detecting light reflected from said optical disk;
    focus error signal generation means for generating a focus error signal which corresponds to defocusing of said object lens relative to a specified one of said recording layers of said optical disk, on the basis of a detection signal of said photodetection means;
    peak detection means for detecting peaks of the focus error signal;
    reference value calculation means for calculating reference values of said focus error signal in accordance with detection signals of said peak detection means;
    comparison signal generation means for comparing said focus error signal with its reference values, and generating comparison signals based on results of the comparisons; and
    control means for accepting a request for moving a focusing position of said object lens, and generating and outputting signals which control said focusing drive means, on the basis of the detection signals of said peak detection means and the comparison signals;
    wherein the signals which control said focusing drive means are a signal which moves said object lens, and a signal which brakes said object lens,
    wherein when the request for moving the focus of said object lens in accepted, the signal for moving said object lens is outputted, and
    wherein when it is sensed from the comparison signal that said focus error signal has exceeded its reference value, the output of said signal for moving said object lens is terminated;
    further comprising:
    means for measuring a 1st time period for which said signal for moving said object lens is outputted; and
    means for calculating a 2nd time period for which the signal for braking said object lens is outputted, on the basis of the measured time period;
    wherein, when it is sensed from the comparison signal that said focus error signal has exceeded its reference value, after the termination of said output of said signal for moving said object lens, said signal for braking said object lens is outputted; and
    after the second time period has lapsed, the output of said signal for braking said object lens is terminated.

2. A focusing control device as claimed in claim 1, further comprising:
    focusing servo means for controlling said focusing drive means on the basis of said focus error signal, thereby to adjust said object lens so that the focusing position thereof may agree with the specified recording layer of said optical disk;
    wherein, when said request for moving said focus of said object lens is accepted, said focusing servo means is disconnected;
    in case where said peak detection means has already detected said peak of said focus error signal at a point of time of the termination of said output of said signal for braking said object lens, said focusing servo means is connected; and
    in a case where said peak detection means has not detected said peak of said focus error signal yet, said focusing servo means is connected after said peak detection means has detected said peak of said focus error signal.

3. A focusing control device as defined in claim 1, wherein:
    said reference value calculation means for calculating said reference values of said focus error signal calculates said reference values before playback of said optical disk; and
    said reference values of said focus error signal are calculated on the basis of the largest error values of said focus error signal in both the polarities, in each of states from a state where said focus of said object lens agrees with the lowermost recording layer of said optical disk, to a state where it agrees with the upper most recording layer.

4. A computer-readable program medium storing a program that is executed by an entertainment apparatus, the entertainment apparatus comprising:
    an object lens which condenses a light beam on an optical disk constructed of a plurality of signal recording layers;

focusing drive means for moving said object lens in a direction orthogonal to the recording layers of the optical disk;

photodetection means for detecting light reflected from said optical disk;

focus error signal generation means for generating a focus error signal which corresponds to defocusing of said object lens relative to a specified one of said recording layers of said optical disk, on the basis of a detection signal of said photodetection means;

peak detection means for detecting peaks of the focus error signal;

reference value calculation means for calculating reference values of said focus error signal in accordance with detection signals of said peak detection means;

comparison signal generation means for comparing said focus error signal with its reference values, and generating comparison signals based on results of the comparisons; and control means for accepting a request for moving a focusing position of said object lens, and generating and outputting signals which control said focusing drive means, on the basis of the detection signals of said peak detection means and the comparison signals;

wherein the signals which control said focusing drive means are a signal which moves said object lens, and a signal which brakes said object lens, wherein when the request for moving the focus of said object lens in accepted, the signal for moving said object lens is outputted, wherein when it is sensed from the comparison signal that said focus error signal has exceeded its reference value, the output of said signal for moving said object lens is terminated; and wherein said program executed by the entertainment apparatus includes:

peak detection program code for detecting peaks of the focus error signal;

reference value calculation program code for calculating reference values of said focus error signal in accordance with detection signals of said peak detection process;

comparison signal generation program code for comparing said focus error signal with its reference values, and generating comparison signals based on results of the comparisons;

program code for accepting a request for moving a focusing position of said object lens, and generating and outputting signals which control said focusing drive means, on the basis of the detection signals of said peak detection means and the comparison signals;

program code for measuring a 1st time period for which said signal for moving said object lens is outputted; and program code for calculating a 2nd time period for which the signal for braking said object lens is outputted, on the basis of the measured time period;

wherein, when it is sensed from the comparison signal that said focus error signal has exceeded its reference value, after the termination of said output of said signal for moving said object lens, said signal for braking said object lens is outputted; and after the second time period has lapsed, the output of said signal for braking said object lens is terminated.

* * * * *